United States Patent [19]

Inoue et al.

[11] Patent Number: 4,793,296
[45] Date of Patent: Dec. 27, 1988

[54] VALVE OPERATING MECHANISM FOR INTERNAL COMBUSTION ENGINE

[75] Inventors: Kazuo Inoue; Kenichi Nagahiro; Yoshio Ajiki; Masaaki Katoh, all of Saitama, Japan

[73] Assignee: Honda Giken Kogyo Kabushiki Kaisha, Tokyo, Japan

[21] Appl. No.: 9,239

[22] Filed: Jan. 30, 1987

[51] Int. Cl.⁴ .............................................. F01L 1/26
[52] U.S. Cl. ............................. 123/90.16; 123/198 F; 123/90.17
[58] Field of Search ............... 123/90.16, 90.17, 90.44, 123/90.39, 198 F

[56] References Cited

U.S. PATENT DOCUMENTS

| | | | |
|---|---|---|---|
| 2,829,540 | 4/1958 | Niemeyer | 74/569 |
| 3,299,869 | 1/1967 | Sicklesteel | 123/90.16 |
| 3,722,484 | 3/1973 | Gordini | 123/90.27 |
| 4,151,817 | 5/1979 | Mueller | 123/90.16 |
| 4,203,397 | 5/1980 | Soeters, Jr. | 123/90.16 |
| 4,206,734 | 6/1980 | Perr et al. | 123/139 AP |
| 4,448,156 | 5/1984 | Henault | 123/90.17 |
| 4,499,870 | 2/1985 | Aoyama | 123/90.16 |
| 4,523,550 | 6/1985 | Matsuura | 123/90.17 |
| 4,534,323 | 8/1985 | Kato et al. | 123/90.16 |
| 4,535,732 | 8/1985 | Nakanao et al. | 123/90.16 |
| 4,537,164 | 8/1985 | Ajiki et al. | 123/90.16 |
| 4,537,165 | 8/1985 | Honda et al. | 123/90.16 |
| 4,545,342 | 10/1985 | Nakano et al. | 123/198 F |
| 4,567,861 | 2/1986 | Hara et al. | 123/90.16 |
| 4,576,128 | 3/1986 | Kenichi | 123/198 F |
| 4,584,974 | 4/1986 | Aoyama et al. | 123/90.16 |
| 4,589,387 | 5/1986 | Miura et al. | 123/90.17 |
| 4,612,884 | 9/1986 | Ajiki et al. | 123/90.16 |
| 4,615,307 | 10/1986 | Kodama et al. | 123/90.16 |
| 4,656,977 | 4/1987 | Nagahiro et al. | 123/198 F |
| 4,690,110 | 9/1987 | Nishimura et al. | 123/90.17 |

FOREIGN PATENT DOCUMENTS

| | | |
|---|---|---|
| 186341 | 7/1986 | European Pat. Off. . |
| 213758 | 3/1987 | European Pat. Off. . |
| 3613945 | 10/1986 | Fed. Rep. of Germany . |
| 1003568 | 3/1952 | France . |
| 61-19911 | 6/1986 | Japan . |
| 61-81510 | 8/1986 | Japan . |
| 511903 | 8/1939 | United Kingdom . |
| 1399813 | 7/1975 | United Kingdom . |
| 2054036 | 2/1981 | United Kingdom . |
| 2066361 | 7/1981 | United Kingdom . |
| 2141172 | 12/1984 | United Kingdom . |
| 2159877 | 12/1985 | United Kingdom . |
| 2185784 | 7/1987 | United Kingdom . |

Primary Examiner—E. Rollins Cross
Attorney, Agent, or Firm—Lyon & Lyon

[57] ABSTRACT

A valve operating mechanism for operating a single valve of a particular cylinder of an internal combustion engine includes a camshaft rotatable in synchronism with rotation of the internal combustion engine and having at least one cam, and a plurality of cam followers, one of which slidably engages the cam for selectively operating the valves according to a cam profile of the cam. The cam followers are selectively interconnected and disconnected to operate the valve differently in different speed ranges of the internal combustion engine. In different embodiments, the camshaft has an annular raised portion and low- and high-speed cams, or low-, medium-, and high-speed cams, or an annular raised portion and a cam, and the cam followers are held in sliding contact with these raised portion and cams. The valve is selectively kept inoperative by the raised portion and operated in low- and high-speed ranges by the low- and high-speed cams, or selectively operated in low-, medium-, and high-speed ranges by the low-, medium-, and high-speed cams, or selectively kept inoperative by the raised portion and operated in a high-speed range by the cam.

6 Claims, 6 Drawing Sheets

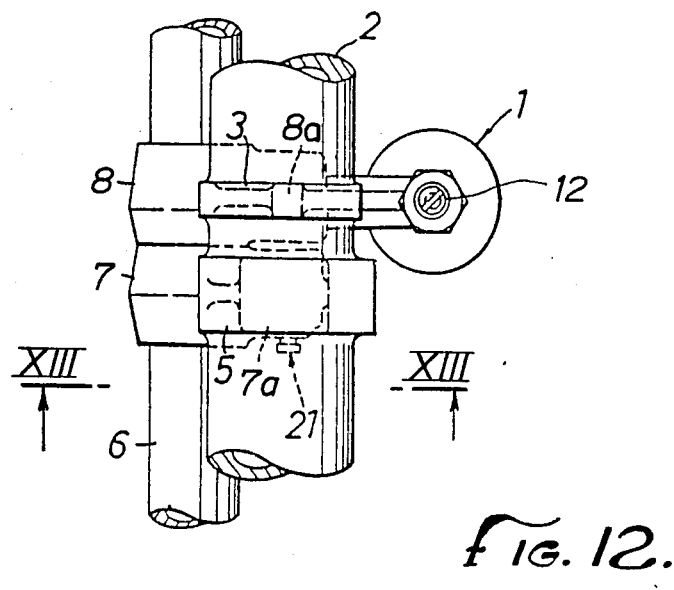
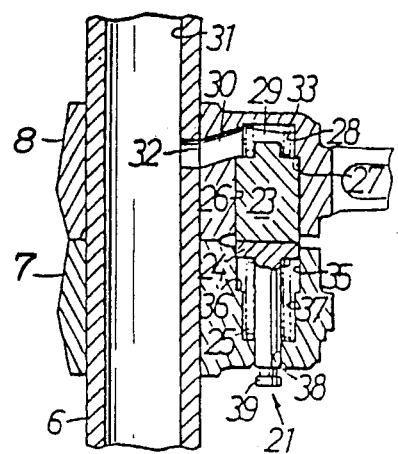
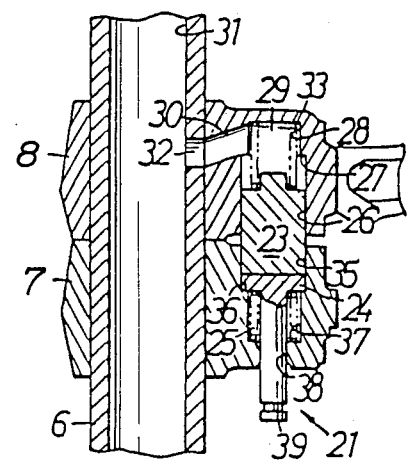

VALVE OPERATING MECHANISM FOR INTERNAL COMBUSTION ENGINE

BACKGROUND OF THE INVENTION

The present invention relates to a valve operating mechanism for an internal combustion engine, including a camshaft rotatable in synchronism with the rotation of the internal combustion engine and having integral cams for operating an intake or exhaust valve, and rocker arms or cam followers angularly movably supported on a rocker shaft for opening and closing the intake or exhaust valve in response to rotation of the cams.

Valve operating mechanisms used in internal combustion engines are generally designed to meet requirements for high-speed operation of the engines. The valve diameter and valve lift are selected to efficiently introduce an air-fuel mixture required to produce maximum engine power in a certain engine speed range.

If an intake valve is actuated at constant valve timing and valve lift throughout a full engine speed range from low to high speeds, then the speed of flow of an air-fuel mixture into the combustion chamber varies from engine speed to engine speed since the amount of air-fuel mixture varies from engine speed to engine speed. At low engine speeds, the speed of flow of the air-fuel mixture is lowered and the air-full mixture is subject to less turbulence in the combustion chamber, resulting in slow combustion therein. Therefore, the combustion efficiency is reduced and so is the fuel economy, and the knocking prevention margin is lowered due to the slow combustion.

One solution to the above problems is disclosed in Japanese Laid-Open Patent Publication No. 59(1984)-226216. According to the disclosed arrangement, some of the intake or exhaust valves remain closed when the engine operates at a low speed, whereas all of the intake or exhaust valves are operated, i.e., alternately opened and closed, during high-speed operation of the engine. Therefore, the valves are controlled differently in low-and high-speed ranges. However, if the valve control were effected in different modes in more speed ranges, the engine output power would be increased and the fuel economy would be improved. Furthermore, if the intake or exhaust valve of a particular engine cylinder of a multicylinder internal combustion engine could be kept inoperative in order to make the particular engine cylinder substantially inactive, fuel consumption would be reduced by stopping the operation of the intake or exhaust valve of the particular engine cylinder while the engine operates in a low-speed range. However, no satisfactory devices have been available in the past to achieve such a task.

SUMMARY OF THE INVENTION

It is an object of the present invention to provide a valve operating mechanism for an internal combustion engine, which controls a valve in low-, medium-, and high-speed ranges for increased engine power and fuel economy.

Another object of the present invention is to provide a valve operating mechanism for an internal combustion engine, which is of a relatively simple structure, for making the intake or exhaust valve of a particular engine cylinder inoperative for better fuel economy.

According to the present invention, there is . a valve operating mechanism for operating a single valve of a particular cylinder of an internal combustion engine, comprising a camshaft rotatable in synchronism with rotation of the internal combustion engine and having at least one cam, a plurality of cam followers, one of which slidably engage the cam for selectively operating the valves according to a cam profile of the cam, and means for selectively interconnecting and disconnecting the cam followers to operate the valve in different speed ranges of the internal combustion engine.

The camshaft has an annular raised portion and low- and high-speed cams, or low-, medium-, and high-speed cams, or a single high speed cam, and the cam followers are held in sliding contact with these raised portion and cams. The valves are selectively kept inoperative by the raised portion and operated in low- and high-speed ranges by the low- and high-speed cams, or selectively operated in low-, medium-, and high-speed ranges by the low-, medium-, and high-speed cams, or selectively kept inoperative by the raised portion and operated in a high-speed range by the single high-speed cam.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 12 is a plan view of a valve operating mechanism according to a yet still further embodiment of the present invention;

FIG. 14 is a cross-sectional view taken along line XIV—XIV of FIG. 13, illustrating first and second cam followers connected to each other; and FIG. 15 is a cross-sectional view similar to FIG. 14, showing the first and second cam followers disconnected from each other.

DESCRIPTION OF THE PREFERRED EMBODIMENTS

Figure 1:
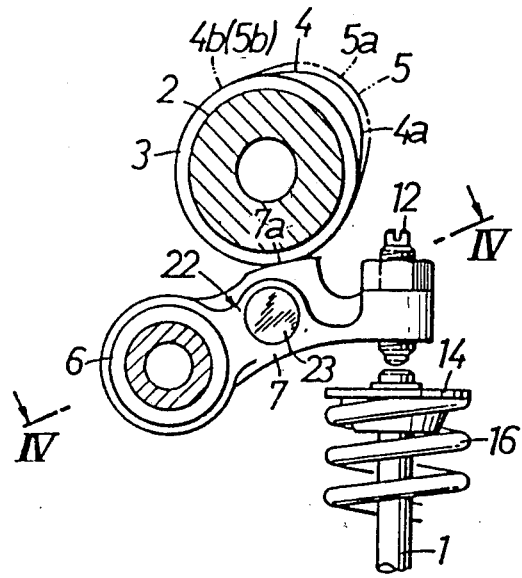
FIG. 1 is a vertical cross-sectional view of a valve operating mechanism according to an embodiment of the present invention, the view being taken along line I—I of FIG. 2.

Like or corresponding parts are denoted by like or corresponding reference characters throughout several views.

Figure 2:
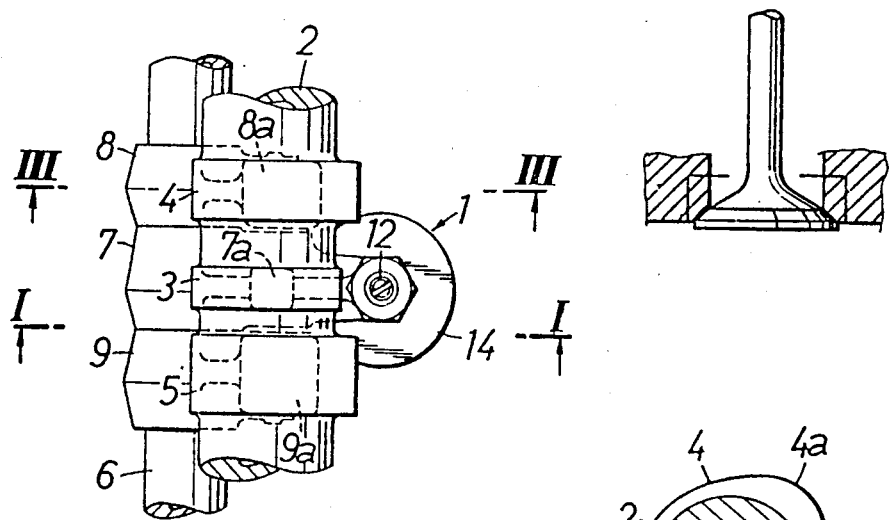
FIG. 2 is a plan view of the valve operating mechanism shown in FIG. 1.

FIGS. 1 and 2 show a valve operating mechanism according to an embodiment of the present invention. The valve operating mechanism is incorporated in a particular engine cylinder of an internal combustion engine including a single intake valve 1 for introducing an air-fuel mixture into a combustion chamber defined in an engine body.

The valve operating mechanism comprises a camshaft 2 rotatable in synchronism with rotation of the engine at a speed ratio of ½ with respect to the speed of rotation of the engine. The camshaft 2 has an annular raised portion 3, a low-speed cam 4, and a high-speed cam 5 which are integrally disposed on the circumference of the camshaft 2. The valve operating mechanism also has a rocker shaft 6 extending parallel to the camshaft 2, and first through third rocker arms or cam follower 7, 8, 9 angularly movably supported on the rocker shaft 6 and held against the raised portion 3, the low-speed cam 4,:and the high-speed cam 5, respectively, on the camshaft 2. The intake valve 1 is selectively operated by the first through third cam followers 7, 8, 9 actuated by the low- and high-speed cams 4, 5.

The camshaft 2 is rotatably disposed above the engine body. The raised portion 3 is disposed in a position above the intake valve 1. The low-speed cam 4 and the high-speed cam 5 are disposed one on each side of the raised portion 3. The raised portion 3 has a circumferential profile in the shape of a circle corresponding to the base circles 4b, 5b of the low- and high-speed cams 4, 5. The low-speed cam 4 has a cam lobe 4a projecting radially outwardly from the base circle 4b, and the high-speed cam 5 has a cam lobe 5a projecting radially outwardly from the base circle 5b to a greater extent than the cam lobe 4a, the cam lob 5a having a larger angular extent than the cam lobe 4a.

The rocker shaft 6 is fixed below the camshaft 2. The first cam follower 7 pivotally supported on the rocker shaft 6 is aligned with the raised portion 3, the second cam follower 8 pivotally supported on the rocker shaft 6 is aligned with the low-speed cam 4, and the third cam follower 9 pivotally supported on the rocker shaft 6 is aligned with the high-speed cam 5. The cam followers 7, 8, 9 have on their upper surfaces cam slippers 7a, 8a, 9a, respectively, held in sliding contact with the raised portion 3 and the cams 4, 5, respectively. The first cam follower 7 has a distal end positioned above the intake valve 1. A tappet screw 12 is threaded through the distal end of the first cam follower 7 and has a tip engagable with the upper end of the valve stem of the intake valve 1.

A flange 14 is attached to the upper end of the valve stem of the intake valve 1. The intake valve 1 is normally urged to close the intake port by a compression coil spring 16 disposed under compression around the valve stem between the flange 14 and the engine body.

Figure 3:
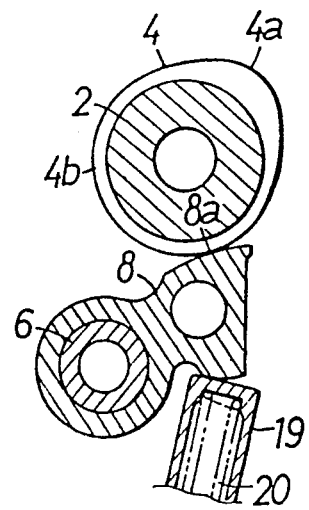
FIG. 3 is a cross-sectional view taken along line III-—III of FIG. 2.

As shown in FIG. 3, a bottomed cylindrical lifter 19 is disposed in abutment against a lower surface of the second cam follower 8. The lifter 19 is normally urged upwardly by a compression spring 20 of relatively weak resiliency interposed between the lifter 19 and the engine body for resiliently biasing the cam slipper 8a of the second cam follower 8 slidably against the low-speed cam 4.

Figure 4:
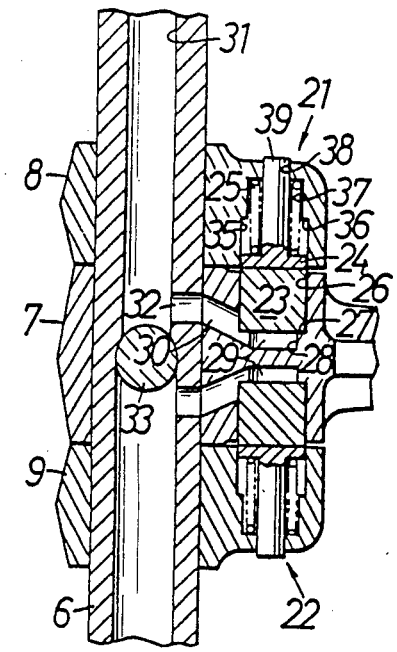
FIG. 4 is a cross-sectional view taken along line IV—IV of FIG. 1, showing first through third cam followers disconnected from each other.

As illustrated in FIG. 4, the first and second cam followers 7, 8 have confronting side walls held in sliding contact with each other. A first selective coupling 21 is operatively disposed in and between the first and second cam followers 7, 8 for selectively disconnecting the cam followers 7, 8 from each other for relative displacement and also for interconnecting the cam followers 7, 8 for their movement in unison. Likewise, the first and third cam followers 7, 9 have confronting side walls held in sliding contact with each other. A second selective coupling 22 is operatively disposed in and between the first and third cam followers 7, 9 for selectively disconnecting the cam followers 7, 9 from each other for relative displacement and also for interconnecting the cam followers 7, 9 for their movement in unison.

The first and second selective couplings 21, 22 are of an identical construction, and hence only the first selective coupling 21 will hereinafter be described in detail.

The first selective coupling 21 comprises a piston 23 movable between a position in which it interconnects the first and second cam followers 7, 8 and a position in which it disconnects the first and second cam followers 7, 8 from each other, a circular stopper 24 for limiting the movement of the piston 23, and a coil spring 25 for urging the stopper 24 to move the piston 23 toward the position to disconnect the first and second cam followers 7, 8 from each other.

The first cam follower 7 has first guide hole 26 opening toward the second cam follower 8 and extending parallel to the rocker shaft 6. The first cam follower 7 also has a smaller-diameter hole 28 near the closed end of the first guide hole 26 with a step or shoulder 27 being defined between the smaller-diameter hole 28 and the first guide hole 26. The piston 23 is slidably fitted in the first guide hole 26. The piston 23 and the closed end of the smaller-diameter hole 28 define therebetween a hydraulic pressure chamber 29.

The first cam follower 7 has a hydraulic passage 30 defined therein in communication with the hydraulic pressure chamber 29. The rocker shaft 6 has a hydraulic passage 31 defined axially therein and coupled to a source (not shown) of hydraulic pressure through a suitable hydraulic pressure control mechanism. The hydraulic passages 30, 31 are held in communication with each other through a hole 32 defined in a side wall of the rocker shaft 6, irrespective of how the first cam follower 7 is angularly moved about the rocker shaft.

The second cam follower 8 has a second guide hole 35 opening toward the first cam follower 7 in registration with the first guide hole 26 in the first cam follower 7. The circular stopper 24 is slidably fitted in the second guide hole 35. The second cam follower 8 also has a smaller-diameter hole 37 near the closed end of the second guide hole 35, with a step or shoulder 36 defined between the second guide hole 35 and the smaller-diameter hole 37 for limiting movement of the circular stopper 24. The second cam follower 8 also has a through hole 38 defined coaxially with the smaller-diameter hole 37. A guide rod 39 joined integrally and coaxially to the circular stopper 24 extends through the hole 38. The coil spring 25 is disposed around the guide rod 39 between the stopper 24 and the closed end of the smaller-diameter hole 37.

The piston 23 has an axial length selected such that when one end of the piston 23 abuts against the step 27, the other end thereof is positioned just between and hence lies flush with the sliding side walls of the first and second cam followers 7, 8, and when the piston 23 is moved into the second guide hole 35 until it displaces the stopper 44 into abutment against the step 36, said one end of the piston 23 remains in the first guide hole 26 and hence the piston 23 extends between the first and second cam followers 7, 8.

The hydraulic passages 31 communicating with the first and second selective couplings 21, 22 are isolated from each other by a steel ball 33 forcibly fitted and fixedly positioned in the rocker shaft 6. Therefore, the first and second selective couplings 21, 22 are operable under hydraulic pressure independently of each other.

Operation of the valve operating mechanism will be described with reference to FIGS. 4 through 6. When the engine is to operate in an ultralow-speed range, the first and second selective couplings 21, 22 are actuated to disconnect the first through third cam followers 7, 8, 9 from each other as illustrated in FIG. 4. More specifically, the hydraulic pressure is released by the hydraulic pressure control mechanism from the hydraulic pressure chamber 29, thus allowing the stopper 24 to move toward the first ca follower 7 under the resiliency of the spring 25 until the piston 23 abuts against the step 27. When the piston 23 engages the step 27, the mutually contacting ends of the piston 23 and the stopper 24 of the first selective coupling 21 lie flush with the sliding side walls of the first and second cam followers 7, 8. Likewise, the mutually contacting ends of the piston 23 and the stopper 24 of the second selective coupling 22 lie flush with the sliding side walls of the first and third cam followers 7, 9. Thus, the first, second, and third cam followers 7, 8, 9 are held in mutually sliding contact for relative angular movement.

With the first through third cam followers 7, 8, 9 being thus disconnected, the first cam follower 7 is not affected by the angular movement of the second and third cam followers 8, 9 in sliding contact with the low- and high-speed cams 4, 5. The first cam follower 7 does not swing as the raised portion 3 imposes no camming action thereon. Any frictional loss of the valve operating mechanism is relatively low because the second cam follower 8 is held in sliding contact with the low-speed cam 4 under the relatively small resilient force of the spring 20.

During ultralow-speed operation of the engine, therefore, the intake valve 1 remains closed, thus reducing fuel consumption.

Figure 5:
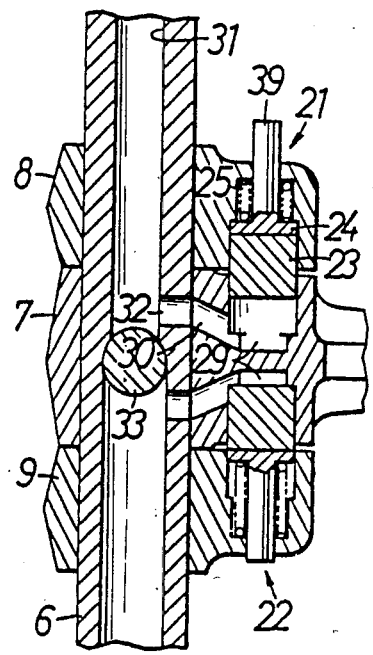
FIG. 5 is a cross-sectional view similar to FIG. 4, showing the first and second cam followers connected to each other.

For low-speed operation of the engine, the first and second cam followers 7, 8 are interconnected by the first selective coupling 21, with the first and third cam followers 7, 9 remaining disconnected from each other, as shown in FIG. 5. More specifically, the hydraulic pressure chamber 29 of the first selective coupling 21 is supplied with hydraulic pressure to cause the piston 23 to push the stopper 24 into the second guide hole 35 against the resiliency of the spring 25 until the stopper 24 engages the step 36. The first and second cam followers 7, 8 are now connected to each other for angular movement in unison.

Therefore, the intake valve 1 alternately opens and closes the intake port at the valve timing and valve lift according to the profile of the low-speed cam 4. The air-fuel mixture now flows into the combustion chamber at a rate suitable for the low-speed operation of the engine, resulting in good fuel economy and knocking prevention.

Figure 6:
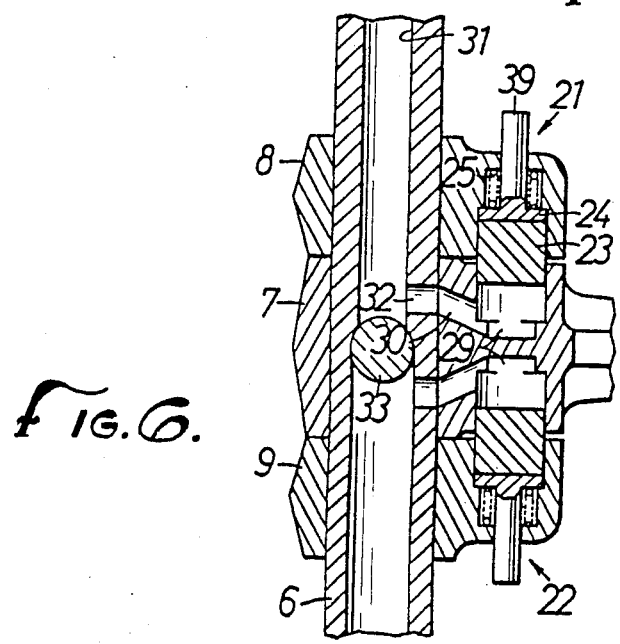
FIG. 6 is a cross-sectional view similar to FIG. 4, showing the first through third cam followers connected to each other.

When the engine is to operate at a high speed, the first and third cam followers 7, 9 are interconnected by the second selective coupling 22, as shown in FIG. 6, by supplying hydraulic pressure into the hydraulic-pressure chamber 29 of the second selective coupling 22. At this time, the first and second cam followers 7, 8 may remain connected by the first selective coupling 21 or may be disconnected thereby. At any rate, the first cam follower 7 is caused to swing with the third cam follower 9. As a consequence, the intake valve 1 alternately opens and closes the intake port at the valve timing and valve lift according to the profile of the high-speed cam 5. The intake efficiency is increased to enable the engine to produce higher output power and torque.

Figure 7:
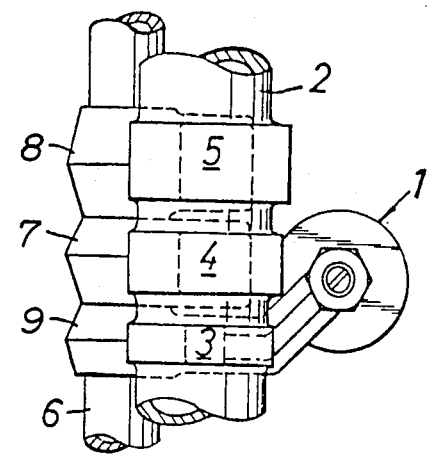
FIG. 7 is a plan view of a valve operating mechanism according to another embodiment of the present invention
Figure 8:
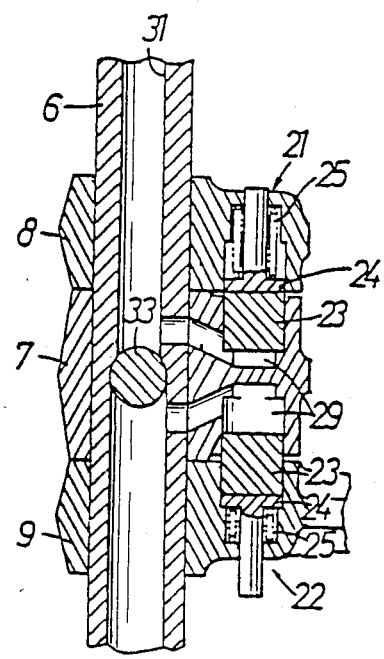
FIG. 8 is a cross-sectional view similar to FIGS. through 6, showing a mode of operation for actuating the valve operating mechanism of FIG. 7.

FIG. 7 shows another embodiment of the present invention in which the low-speed cam 4 is disposed between the high-speed cam 5 and the raised portion 3. The first and second cam followers 7, 8 are held in sliding contact with the low- and high-speed cams 4, 5, respectively, whereas the third cam follower slidingly contacts the raised portion 3, the third cam follower 9 being engageable with the intake valve 1. In the ultra-low-speed range, the first and second selective couplings 21, 22 are operated as shown in FIG. 4, and hence the cam followers 7, 8, 9 are independently pivotable, allowing the intake valve 1 to remain closed. In the low-speed range, the first and third cam followers 7, 9 are interconnected and the first and second cam followers 7, 8 remain disconnected by operating the first and second selective couplings 21, 22 as shown in FIG. 8. Therefore, the intake valve 1 is controlled according to the cam profile of the low-speed cam 4. In the high-speed range, the cam followers 7, 8, 9 are interconnected as shown in FIG. 6 to cause the intake valve 1 to operate according to the cam profile of the high-speed cam 5.

Figure 9:
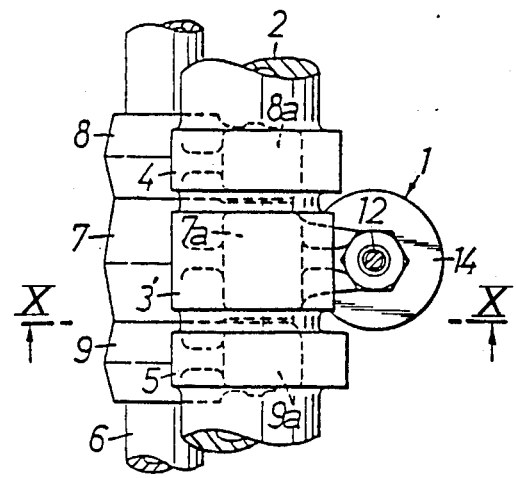
FIG. 9 is a plan view of a valve operating mechanism according to still another embodiment of the present invention.
Figure 10:
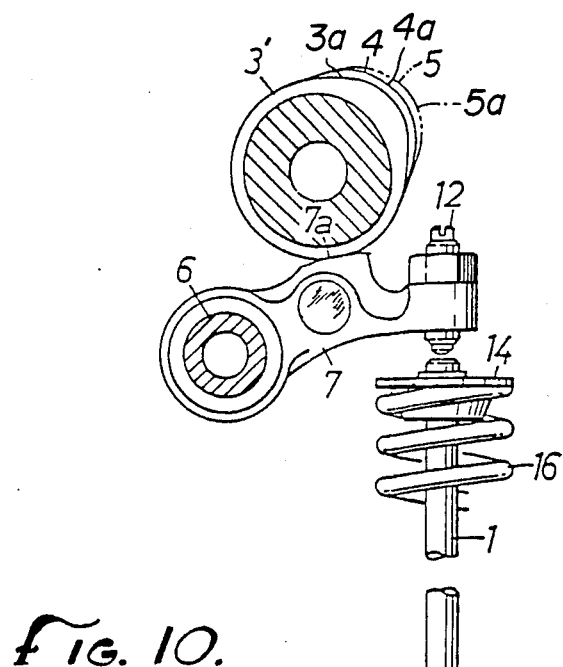
FIG. 10 is a cross-sectional view taken along line X—X of FIG. 9.

FIGS. 9 and 10 show still another embodiment of the present invention. The camshaft 2 supports thereon a low-speed cam 3', a medium-speed cam 4, and a high-speed cam 5 which have cam lobes 3a, 4a, 5a, respectively. The cam lobe 5a is larger in radial projection and angular extent than the cam lobe 4a, which in turn is larger in radial protection and angular extent than the cam lobe 3a. The first cam follower 7, which is engageable with the intake valve 1, is held in sliding contact with the low-speed cam 3', while the second and third cam followers 8, 9 are held in sliding contact with the medium- and high-speed cams 4, 5. In the low-speed range, the cam follower 7, 8, 9 are disconnected from each other, as shown in FIG. 4, and the intake valve 1 is operated according to the cam profile of the low-speed cam 3'. In the medium-speed range, the first and second cam followers 7, 8 are interconnected and the first and third cam followers 7, 9 remain disconnected, as shown in FIG. 5, causing the intake valve 1 to be operated by the medium-speed cam 4. In the high-speed range, the cam followers 7, 8, 9 are interconnected, as shown in FIG. 6, or only the first and third cam followers 7, 9 are interconnected, as shown in FIG. 8, for thereby enabling the intake valve 1 to be controlled by the high-speed cam 5.

Figure 11:
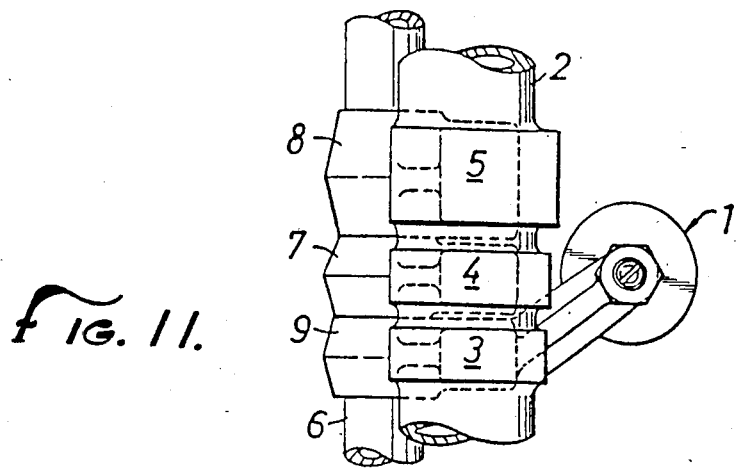
FIG. 11 is a plan view of a valve operating mechanism according to a still further embodiment of the present invention.

According to a still further embodiment illustrated in FIG. 11, the medium-speed cam 4 is positioned between the low- and high-speed cams 3', 5. The first and second cam followers 7, 8 are kept in sliding contact with the medium- and high-speed cams 4, 5. The low-speed cam 3' is slidingly engaged by the third cam follower 9 which is engageable with the intake valve 1. During low-speed engine operation, the cam followers 7, 8, 9 are disconnected, as shown in FIG. 4, and the intake valve 1 is controlled by the low-speed cam 3'. In the medium-speed range, the first and third cam followers 7, 9 are interconnected, and the first and second cam followers 7, 8 remain disconnected, as shown in FIG. 8, to operate the intake valve 1 according to the cam profile of the medium-speed cam 4. In the high-speed range, all of the cam followers 7, 8, 9 are interconnected, as shown in FIG. 6, to control the intake valve 1 according to the cam profile of the high-speed cam 5.

Figure 13:
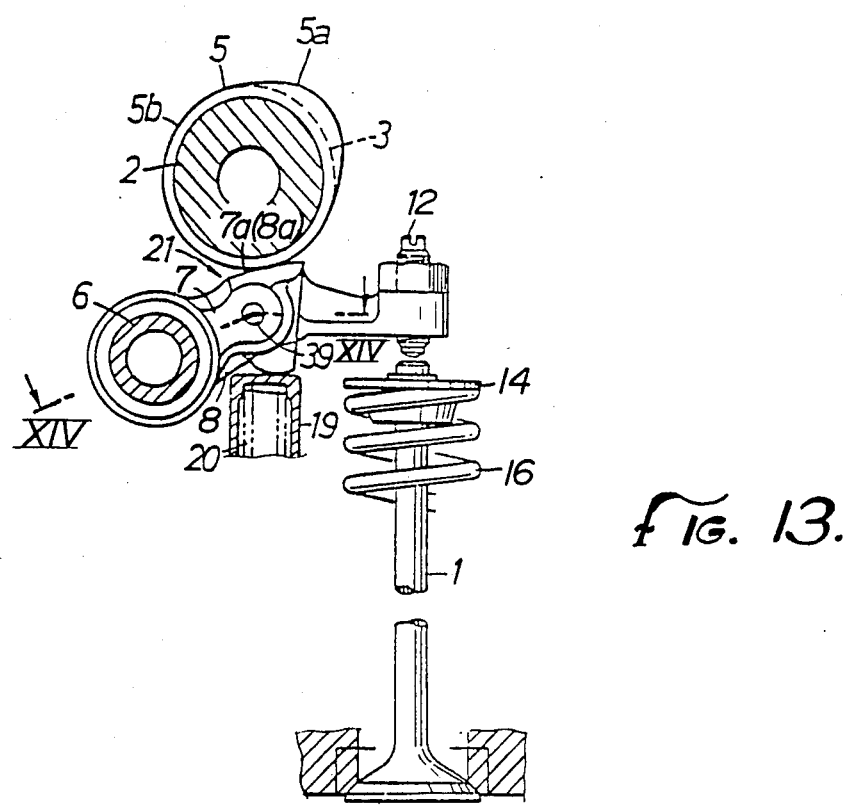
FIG. 13 is a cross-sectional view taken along line XIII—XIII of FIG. 12.

FIGS. 12 and 13 illustrate a valve operating mechanism according to a yet still further embodiment of the present invention. The camshaft 2 has an annular raised portion 3 and a cam 5 which are integrally disposed on the circumference of the camshaft 2. First and second cam followers 7, 8 are angularly movably supported on the rocker shaft 6 and held against the cam and the raised portion 3, respectively, on the camshaft 2. The intake valve 1 remains closed or inoperative by the raised portion 3 in a low-speed range of the engine.

The camshaft 2 is rotatably disposed above the engine body. The raised portion 3 is disposed in a position above the intake valve 1. The raised-portion 3 has a circumferential profile in the shape of a circle corresponding to the base circle 5b of the cam 5. The ca 5 has a cam lobe 5a projecting radially outwardly from the base circle 5b.

The rocker shaft 6 is fixed below the camshaft 2. The first cam follower 7 pivotally supported on the rocker shaft 6 is aligned with the cam 5, and the second cam follower 8 pivotally supported on the rocker shaft 6 is aligned with the raised portion 3. The cam followers 7, 8 have on their upper surfaces cam slippers 7a, 8a, respectively, held in sliding contact with the cam 5 and the raised portion 3, respectively. The second cam follower 8 has a distal end positioned above the intake valve 1. A tappet screw 12 is threaded through the distal end of the second ca follower 8 and has a tip engagable with the upper end of the valve stem of the intake valve 1.

A flange 14 is attached to the upper end of the valve stem of the intake valve 1. The intake valve 1 is normally urged to close the intake port by a compression coil spring 16 disposed under compression around the valve stem between the flange 14 and the engine body.

A bottomed cylindrical lifter 19 is disposed in abutment against a lower surface of the first cam follower 7. The lifter 19 is normally urged upwardly by a compression spring 20 of relatively weak resiliency interposed between the lifter 19 and the engine body for resiliently biasing the cam slipper 7a of the first cam follower 7 slidably against the cam 5.

As illustrated in FIG. 14, the first and second cam followers 7, 8 have confronting side walls held in sliding contact with each other. A selective coupling 21 is operatively disposed in and between the first and second cam followers 7, 8 for selectively disconnecting the cam followers 7, 8 from each other for relative displacement and also for interconnecting the cam followers 7, 8 for their movement in unison.

The selective coupling 21 comprises a piston 23 movable between a position in which it interconnects the first and second cam followers 7, 8 and a position in which it disconnects the first and second cam followers 7, 8 from each other, a circular stopper 24 for limiting the movement of the piston 23, and a coil spring 25 for urging the stopper 24 to move the piston 23 toward the position to disconnect the first and second cam followers 7, 8 from each other.

The second cam follower 8 has a first guide hole 26 opening toward the first cam follower 7 and extending parallel to the rocker shaft 6. The second cam follower 8 also has a smaller-diameter hole 28 near the closed end of the first guide hole 26, with a step or shoulder 27 being defined between the smaller-diameter hole 28 and the first guide hole 26. The piston 23 is slidably fitted in the first guide hole 26. The piston 23 and the closed end of the smaller-diameter hole 28 define therebetween a hydraulic pressure chamber 29.

The second cam follower 8 has a hydraulic passage 30 defined therein in communication with the hydraulic pressure chamber 29. The rocker shaft 6 has a hydraulic passage 31 defined axially therein and coupled to a source (not shown) of hydraulic pressure through a suitable hydraulic pressure control mechanism. The hydraulic passages 30, 31 are held in communication with each other through a hole 32 defined in a side wall of the rocker shaft 6, irrespective of how the second cam follower 8 is angularly moved about the rocker shaft 6.

The first cam follower 7 has a second guide hole 35 opening toward the second cam follower 8 in registration with the first guide hole 26 in the second cam follower 8. The circular stopper 24 is slidably fitted in the second guide hole 35. The first cam follower 7 also has a smaller-diameter hole 37 near the closed end of the second guide hole 35, with a step or shoulder 36 defined between the second guide hole 35 and the smaller-diameter hole 37 for limiting movement of the circular stopper 24. The first cam follower 7 also has a through hole 38 defined coaxially with the smaller-diameter hole 37. A guide rod 39 joined integrally and coaxially to the circular stopper 24 extends through the hole 38. The coil spring 25 is disposed around the guide rod 39 between the stopper 24 and the closed end of the smaller-diameter hole 37.

The piston 23 has an axial length selected such that when one end of the piston 23 abuts against the step 27, the other end thereof is positioned just between and hence lies flush with the sliding side walls of the first and second cam followers 7, 8, and when the piston 23 is moved into the second guide hole 35 until it displaces the stopper 24 into abutment against the step 36, said one end of the piston 23 remains in the first guide hole 26 and hence the piston 23 extends between the first and second cam followers 7, 8. The piston 23 is normally urged toward the first cam follower 7 under the resiliency of a coil spring 33 disposed in the hydraulic-pressure chamber 29 and acting between the piston 23 and the closed bottom of the smaller-diameter hole 28. The resilient force of the spring 33 set under compression in the hydraulic pressure chamber 29 is selected to be smaller than that of the spring 25 set in place under compression.

Operation of the valve operating mechanism will be described with reference to FIGS. 14 and 15. When the engine is to operate in a low-speed range, the selective coupling 21 is actuated to disconnect the first and second cam follower 7, 8 from each other as illustrated in FIG. 15. More specifically, the hydraulic pressure is released by the hydraulic pressure control mechanism from the hydraulic pressure chamber 29, thus allowing the stopper 24 to move toward the second cam follower 8 under the resiliency of the spring 25 until the piston 23 abuts against the step 27. When the piston 23 engages the step 27, the mutually contacting ends of the piston 23 and the stopper 24 lie flush with the sliding side walls o the first and second cam followers 7, 8. Therefore, the first and second cam followers 7, 8 are held in mutually sliding contact for relative angular movement.

With the first and second cam followers 7, 8 being thus disconnected, the first cam follower 7 as angularly moved in sliding contact with the cam 5, whereas the second cam follower 8 is held in sliding contact with the raised portion 3. Since the raised portion 3 does not impose any camming action on the second cam follower 8, the intake valve 1 remains closed. The swinging movement of the first cam follower 7 which is caused by the cam 5 does not affect the intake valve 1 as the first cam follower 7 is disconnected from the second cam follower 8 at this time. Any frictional loss of the valve operating mechanism is relatively low because the first cam follower 7 is held in sliding contact with the cam 5 under the relatively small resilient force of the spring 20.

During low-speed operation of the engine, therefore, the intake valve 1 remains closed or inoperative for reducing fuel consumption.

For high-speed operation of the engine, the first and second cam followers 7, 8 are interconnected by the selective coupling 21, as shown in FIG. 14. More specifically, the hydraulic pressure chamber 29 of the selective coupling 21 is supplied with hydraulic pressure to cause the piston 23 to push the stopper 24 into the second guide hole 35 against the resiliency of the spring 25 until the stopper 24 engages the step 36. The first and second cam followers 7, 8 are now connected to each other for angular movement in unison.

At this time, the second cam follower 8 is caused to swing with the first cam follower 7. Therefore, the intake valve alternately opens and closes the respective intake ports at the valve timing and valve lift according to the profile of the cam 5.

While the intake valve 1 is shown as being operated by each of the valve operating mechanisms, an exhaust valve may also be operated by the valve operating mechanisms according to the present invention. In such a case, unburned components due to exhaust gas turbulence can be reduced in low-speed operation of the engine, whereas high engine output power and torque can be generated by reducing resistance to the flow of an exhaust gas from the combustion chamber in high-speed operation of the engine.

Although certain preferred embodiments have been shown and described, it should be understood that many changes and modifications-may be made therein without departing from the scope of the appended claims.

We claim:

1. A valve operating mechanism for operating a single valve of a particular cylinder of an internal combustion engine, comprising:
   a camshaft rotatable in synchronism with rotation of the internal combustion engine;
   a plurality of cams on said camshaft with each of said cams bearing a different cam profile;
   a plurality of cam followers, each of which slidably engages one of said cams for selectively operating the valve according to the profile of the selected cam and one of which engages said valve; and
   means for selectively interconnecting and disconnecting the respective cam followers to operate the valve differently in different speed ranges of the internal combustion engine.

2. A valve operating mechanism according to claim 1, wherein said camshaft has an annular raised portion, a low-speed cam, and a high-speed cam, said raised portion being positioned between said low- and high-speed cams, said cam followers including cam follower which slidably engage said low- and high-speed cams, respectively, and a cam follower which slidably engages said raised portion for controlling said valve, said means including means for selectively keeping said valve inoperative in a speed range with said raised portion, and operating said valve in a low-speed range with said low-speed cam and in a high-speed range with said high-speed cam.

3. A valve operating mechanism according to claim 1, wherein said camshaft has an annular raised portion, a low-speed cam, and a high-speed cam, said low-speed cam being positioned between said raised portion and said high-speed cam, said cam followers including cam followers which slidably engage said low- and high-speed cams, respectively, and a cam follower which slidably engages said raised portion for controlling said valve, said means including means for selectively keeping said valve inoperative in a speed range with said raised portion, and operating said valve in a low-speed range with said low-speed cam and in a high-speed range with said high-speed cam.

4. A valve operating mechanism according to claim 1, wherein said camshaft has a low-speed cam, a medium-speed cam, and a high-speed cam, said low-speed cam being positioned between said medium- and high-speed cams, said cam followers including cam followers which slidably engage said low- and high-speed cams, respectively, and a cam follower which slidably engages said low-speed cam for controlling said valve, said means including means for operating said valve selectively in a low-speed range with said low-seed cam, in a medium-speed range with said medium-speed cam, and in a high-speed range with said high-speed cam.

5. A valve operating mechanism according to claim wherein said camshaft has a low-speed cam, a medium-speed cam, and a high-speed cam, said medium-speed cam being positioned between said low- and high-speed cams, said cam followers including cam followers which slidably engage said medium- and high-speed cams, respectively, and a cam follower which slidably engages said low-speed for controlling said valve, said means including means for operating said valve selectively in a low-speed range with said low-seed cam, in a medium-speed range with said medium-speed cam, and in a high-speed range with said high-speed cam.

6. A valve operating mechanism according to claim 1, wherein said camshaft has an annular raised portion positioned adjacent to said cam, said cam followers including a cam follower which slidably engages said raised portion for controlling said valve, said means including means for selectively keeping said valve inoperative in a speed range with said raised portion and operating said valve in a high-speed range with said cam.

* * * * *